(12) United States Patent
Park et al.

(10) Patent No.: US 9,305,215 B2
(45) Date of Patent: Apr. 5, 2016

(54) APPARATUS, METHOD AND COMPUTER READABLE RECORDING MEDIUM FOR ANALYZING VIDEO USING IMAGE CAPTURED FROM VIDEO

(71) Applicant: NHN Corporation, Seongnam-si (KR)

(72) Inventors: Gunhan Park, Seongnam-si (KR); Jeanie Jung, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 401 days.

(21) Appl. No.: 13/940,984

(22) Filed: Jul. 12, 2013

(65) Prior Publication Data

US 2014/0050400 A1    Feb. 20, 2014

(30) Foreign Application Priority Data

Aug. 17, 2012  (KR) .......................... 10-2012-0089860

(51) Int. Cl.
*G06K 9/00* (2006.01)
*G06F 17/30* (2006.01)

(52) U.S. Cl.
CPC ...... *G06K 9/00536* (2013.01); *G06F 17/30244* (2013.01); *G06K 9/00711* (2013.01)

(58) Field of Classification Search
USPC ........................................................ 382/305
See application file for complete search history.

(56) References Cited

U.S. PATENT DOCUMENTS

| | | | | |
|---|---|---|---|---|
| 6,751,776 B1 * | 6/2004 | Gong | ................ | G06F 17/30616 707/E17.028 |
| 6,760,042 B2 * | 7/2004 | Zetts | .................... | G11B 27/002 375/E7.004 |
| 7,477,780 B2 * | 1/2009 | Boncyk | ............. | G06F 17/30256 382/165 |
| 7,590,309 B1 * | 9/2009 | Steffan | .................... | G06T 7/001 382/305 |
| 8,196,045 B2 * | 6/2012 | Chandratillake | . | G06F 17/30817 715/719 |
| 9,037,979 B2 * | 5/2015 | Park | .................... | H04N 21/8543 715/239 |
| 2002/0033842 A1 * | 3/2002 | Zetts | .................... | G11B 27/002 175/719 |
| 2012/0177292 A1 * | 7/2012 | Cheon | ............... | G06F 17/30026 382/190 |
| 2015/0279427 A1 * | 10/2015 | Godfrey | ................. | G11B 27/10 386/241 |

* cited by examiner

*Primary Examiner* — Ishrat I Sherali
(74) *Attorney, Agent, or Firm* — Greer Burns & Crain Ltd.

(57) ABSTRACT

An apparatus for analyzing a video capture screen includes: a video frame extracting unit extracting at least one frame from a video having a plurality of frames; an extracted frame digitizing unit digitizing features of each of the at least one frame extracted by the video frame extracting unit; an image digitizing unit digitizing features of at least one collected search target image; an image comparing and searching unit comparing the search target image with the at least one frame extracted from the plurality of frames by digitized values of the collected search target image and the at least one frame; and a search result processing unit mapping related information of the collected search target image to a frame coinciding with the search target image and storing the related information in a database, when the extracted at least one frame coinciding with the search target image is present in a comparison result.

20 Claims, 8 Drawing Sheets

FIG. 5
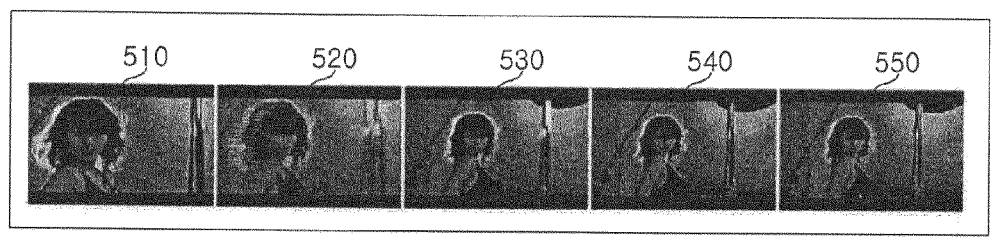
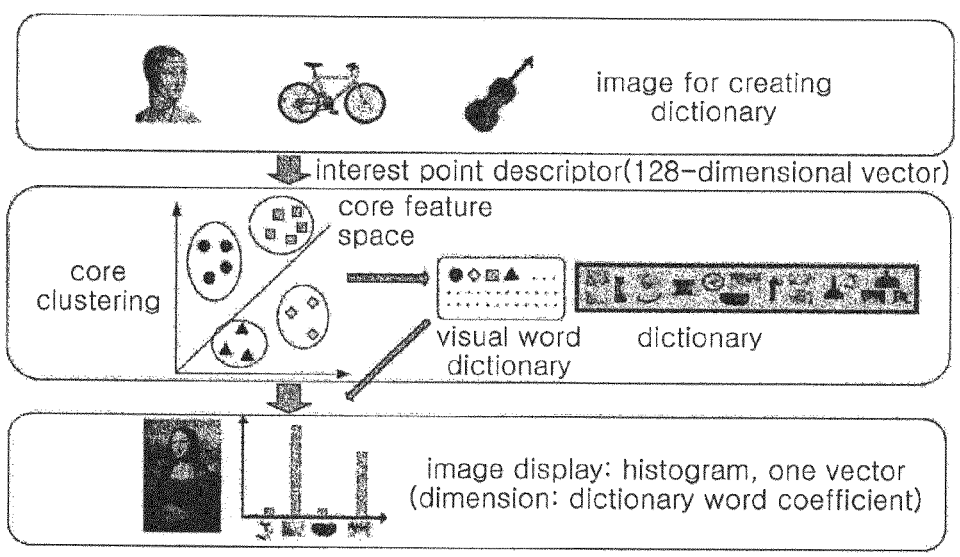

FIG. 8

PROGRAM A    [search]

Videos 1-16/1,013       800

[Basic sequence]  [Up-to-dateness sequence]  [Issue sequence]

810

PROGRAM A - Mr. Cha's eyes are shining.. 2012.05.23

820

Mention of scene in video

| news | blog | twitter | facebook |
| 115times | 89times | 76times | 923times |
| 821 | 822 | 823 | 824 |

14sec.

②This is my way [PROGRAM A]... 2012.06.09

Mention of scene in video news 45times    blog 79times    twitter 54times    facebook 433times 5min. 0sec.

PROGRAM A, Dear Monk 2012.06.11

Mention of scene in video news 35times    blog 49times    twitter 34times    facebook 367times 5min. 0sec.

PROGRAM A! Dialog in the dark 2012.05.12

Mention of scene in video news 15times    blog 39times    twitter 34times    facebook 228times 4min. 59sec.

FIG. 9

Mention of scene in video ~900

News

Program A Mr. Cha's suffle dance
[Daily News A]

'Program A', Mr. Cha's suffle dance and
shining eyes [Daily News B]    }910

Program A Mr. Cha, danding a shocking
shuffle dance [Daily News C]

Twitter

Twitter/AKH: It was really nice to see
Mr. Cha from Program A
Twitter.com/AKH123/status/120931824903 – saved page
March 13, 2012 – It was really nice to see
Mr. Cha from Program A, especially his
shining eyes and suffle dance!                            }920

Twitter/@BKS/tk-Hanwool
Twitter.com/BKS/lists/tk-Hanwool – saved page
Mr. Cha is talking about life in Program A.

APPARATUS, METHOD AND COMPUTER READABLE RECORDING MEDIUM FOR ANALYZING VIDEO USING IMAGE CAPTURED FROM VIDEO

CROSS-REFERENCE TO RELATED APPLICATIONS

This application claims priority from and the benefit of Korean Patent Application No. 10-2012-0089860, filed on Aug. 17, 2012, which is hereby incorporated by reference for all purposes as if fully set forth herein.

BACKGROUND

The present invention relates to an apparatus for analyzing an image captured from a video, and more particularly, to an apparatus, a method, and a computer readable recording medium for analyzing a video using a captured image, for collecting screen images from a video through a network and analyzing information related to the respective collected images.

Generally, the Internet is an open network configured to apply a common protocol called a transfer control protocol/Internet protocol (TCP/IP) to opponent computers that enables anybody anywhere in the world to freely access and use the computers. Users may use various services such as transmission of multimedia information in accordance with the development of a compression technology, transmission of an e-mail, transmission of a file, the World Wide Web (WWW), and the like, as well as transmission of basic character information, through the Internet.

As described above, in accordance with the rapid increase in the use of the Internet domestically and globally, the importance of the Internet as a strategic tool for increasing efficiency and productivity over all of the existing industries has rapidly increased. New business opportunities through the Internet have also been continuously created, fields of the Internet have expanded, and operators using the Internet have also gradually increased.

Meanwhile, recently, in accordance with the diffusion of digital apparatuses such as smart phones, and the like, a large amount of private video contents (for example, user created content (UCC)) have been created, and it has been generalized to view television broadcasting, movie contents, and the like, on the web through a video on demand (VOD) service, or the like.

In order to allow these video contents to be smoothly consumed, various video meta information including information on a specific scene is required so that search and browsing for desired contents are possible. For example, in a current video search or service, meta information in a text form related to a video, such as the title, the date, the number of views, and the like, of the video, has been mainly used, and the popularity of a video has been recognized using the number of views, and the like, of the corresponding video.

However, in a method of searching a video using only the meta information in a text form as described above, a popular scene in a corresponding video that should be viewed may not be recognized, and the number of discussions about the video on the Internet (for example, other websites), except for the case in which the video is directly linked and posted, may also not be recognized.

In addition, cases in which users upload a specific screen image captured from the video, rather than the video itself, on the web and have discussions about the contents of the corresponding video with other users on a social network service (SNS) sites such as Facebook, Twitter, or the like, or their blogs or homepages through the specific screen image has been frequently generated.

Particularly, in the case of contents requiring a copyright and a log-in in order to be reproduced, it is difficult to directly post and attach the contents on a website, and it is not easy to acquire a unique uniform resource locator (URL) for a specific scene of a video about which the user wants to talk. Therefore, even in news, only a specific scene of a broadcasting or a movie, instead of the corresponding video, is captured and utilized as an article.

As described above, information including rich meta information related to a video distributed together with an image captured from the video has not been directly connected to the corresponding video.

Meanwhile, as a technology for providing related information on video contents, a contents service method capable of generating source information in a video literary work, storing the source information in a database, and calculating similarity between the source information and scene data to extract a source has been disclosed in Korean Patent Registration No. 10-0857381 (Patent Document 1) entitled "Content Service System and Method" and filed by NHN Inc.

However, these methods according to the related art simply provide only the meta information on a video and do not provide related information on images in which main scenes are captured.

Therefore, a method of effectively providing various related information on each image captured from a video to increase utilization of the video has been demanded.

BRIEF SUMMARY OF THE INVENTION

An object of the present invention is to provide an apparatus, a method, and a computer readable recording medium for analyzing a video using a captured image capable of providing various meta information on the video by comparing the respective frames extracted from the video with the captured image collected by an external website, or the like.

Another object of the present invention is to provide an apparatus, a method, and a computer readable recording medium for analyzing a video using a captured image capable of analyzing information from news, a blog, a social network service (SNS) post, and the like, in which the respective frames extracted from the video are compared with the captured image collected by an external website, or the like.

Still another object of the present invention is to provide an apparatus, a method, and a computer readable recording medium for analyzing a video using a captured image capable of analyzing social rankings, such as what frame in the video was the largest issue or what video contents have gained popularity in an SNS by comparing the respective frames extracted from the video with the captured images collected by an external website, or the like.

A characteristic configuration of the present invention for accomplishing the objects of the present invention as described above and unique effects of the present invention will be described below.

According to an exemplary embodiment of the present invention, there is provided an apparatus for analyzing a video capture screen, the apparatus comprising: at least one storage device, a processor configured to execute the functions of a video frame extracting unit configured to extract at least one frame from a video having a plurality of frames; an extracted frame digitizing unit configured to digitize features of each of the at least one frame extracted by the video frame extracting unit; an image digitizing unit configured to digitize features of at least one collected search target image; an image comparing and searching unit configured to compare the search target image with the at least one frame extracted from the plurality of frames by digitized values of the collected search target image and the at least one frame; and a search result processing unit configured to map related information of the collected search target image to a frame coinciding with the search target image and storing the related information in a database, when the at least one extracted frame coinciding with the search target image is present in a comparison result.

The apparatus may further comprise: a representative frame extracting unit configured to determine one frame selected among the at least one frame to be a representative frame in a case in which an image difference among a plurality of continuous frames extracted by the video frame extracting unit is in a preset range, wherein the extracted frame is configured to digitize unit digitizes the representative frame determined by the representative frame extracting unit and store the digitized representative frame in the database.

The representative frame extracting unit may be configured to determine one frame selected among the plurality of continuous frames to be the representative frame in a case in which a difference value in a gray histogram among the plurality of continuous frames is a predetermined value or less.

The representative frame extracting unit may be configured to determine at least one frame to be the representative frame per a preset time.

The extracted frame digitizing unit may be configured to digitize invariant points of the at least one extracted frame and then represent the invariant points by a frequency of visual words converted into predefined cluster values.

The image digitizing unit may be configured to digitize invariant points of the at least one collected search target image and then represent the invariant points by a frequency of visual words converted into predefined cluster values.

The image comparing and searching unit may be configured to compare the visual words of the at least one extracted frame with the visual words of the at least one collected search target image and determine that corresponding frames and images coincide with each other when a number of same visual words is a preset number or more.

The related information of the collected search target image may be any one or more selected among a source in which the collected search target image is posted, a number of retweets of the collected search target image on a social network service (SNS), a number of replies, a number of recommendations, and evaluation information.

The apparatus may further comprise a result analysis processing unit configured to automatically calculate statistical values for the extracted at least one frame for a specific video from the comparison result stored by the search result processing unit to generate an analysis result.

The result analysis processing unit may be configured to provide information selected from a number of citations in news, a blog, an SNS site referencing a corresponding image in the video and corresponding link information with respect to the extracted at least one frame of the video according to a result analysis request.

The result analysis processing unit may be configured to calculate and provide rankings of the extracted at least one frame from a number of citations in news, a blog, an SNS site referencing a corresponding image in the video with respect to the respective frames of the specific video according to a result analysis request.

According to another exemplary embodiment of the present invention, there is provided a method that uses a processor to analyze a video capture screen, the method comprising: extracting at least one frame from a video having a plurality of frames; digitizing features of the extracted at least one frame; digitizing features of at least one collected search target image; comparing, by the processor, the search target image with the at least one frame extracted from the plurality of frames by digitized values of the collected search target image and the at least one frame; and mapping related information of the collected search target image to a frame coinciding with the search target image and storing the related information in a database, when the extracted at least one frame coinciding with the search target image is present in a comparison result.

Information for providing the method of analyzing a video using a captured image may be stored in a server computer readable recording medium. The recording medium may be any kind of recording media in which a program and data are stored so as to be readable by a computer system. The recording medium may include a read only memory (ROM), a random access memory (RAM), a compact disk (CD), a digital video disk (DVD) ROM, a magnetic tape, a floppy disk, an optical data storage, or the like, and a medium implemented in the form of a carrier wave (for example, transmission through the Internet). In addition, the recording medium may be distributed in a computer system connected by a network, such that a computer readable code may be stored and executed in a distributed scheme.

BRIEF DESCRIPTION OF THE DRAWINGS

FIG. 5 is a diagram showing a method for selecting a representative frame according to the exemplary embodiment of the present invention;

FIG. 6 is a diagram showing a concept of a method for digitizing a representative frame according to the exemplary embodiment of the present invention;

FIGS. 8 to 10 are diagrams showing examples of a result of analyzing a video using a captured image according to the exemplary embodiment of the present invention.

DETAILED DESCRIPTION OF THE ILLUSTRATED EMBODIMENTS

Figure 1:
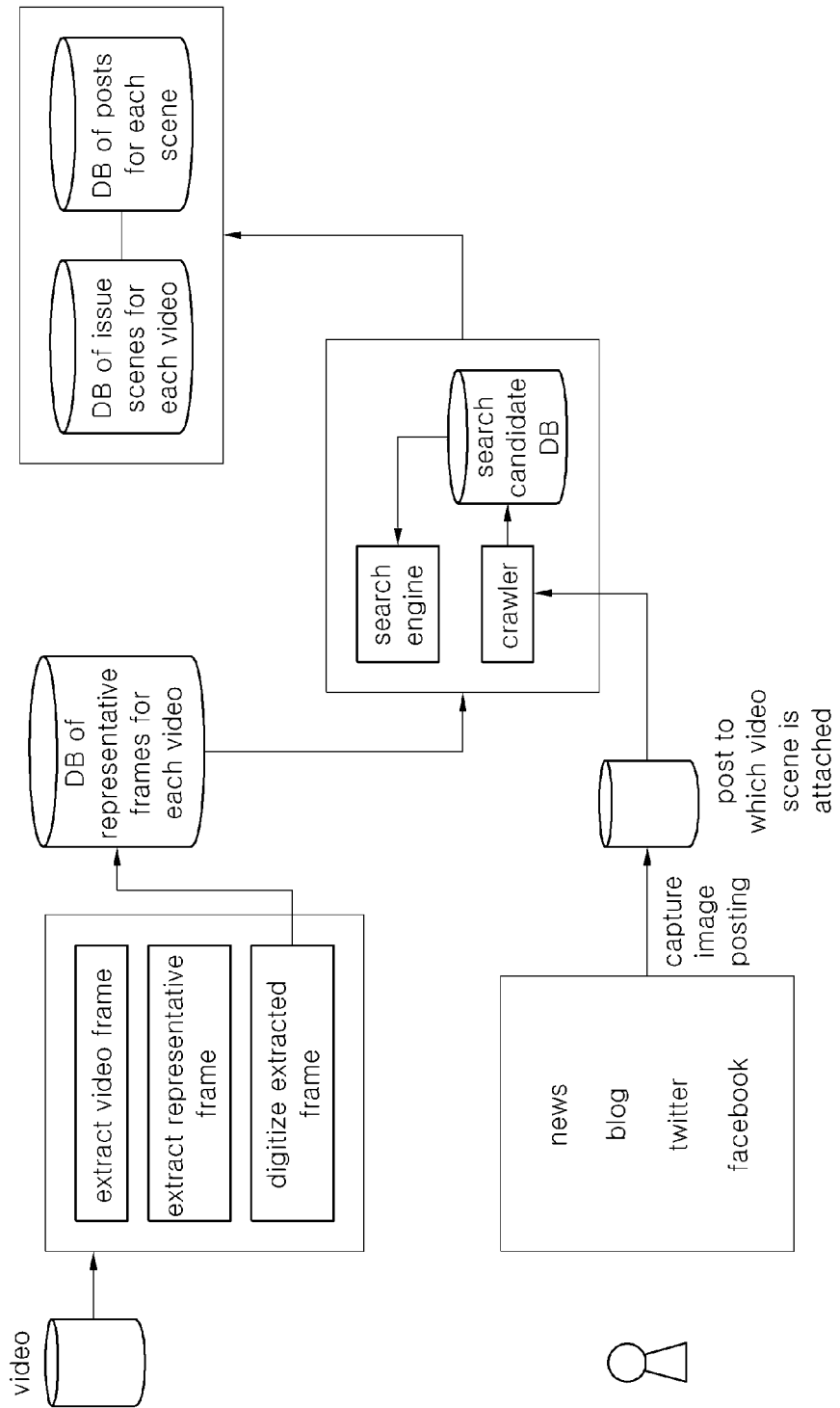
FIG. 1 is a diagram showing a concept of analyzing a video using a captured image according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

In addition, embodiments described in the specification are wholly hardware, and may be partially software or wholly software. In the specification, "unit", "module", "device", "system", or the like represents a computer related entity such as hardware, combination of hardware and software, or software. For example, in the specification, the unit, the module, the device, the system, or the like may be an executed process, a processor, an object, an executable file, a thread of execution, a program, and/or a computer, but are not limited thereto. For example, both of an application which is being executed in the computer and a computer may correspond to the unit, the module, the device, the system, or the like in the specification.

Hereinafter, exemplary embodiments of the present invention will be described in detail with reference to the accompanying drawings.

The present invention discloses a video capture image analyzing apparatus capable of providing various meta information on the video and a main frame of the video by collecting captured screen images through an external server, or the like, and comparing the collected screen images with standard frames extracted from the video.

That is, in the present invention, an image captured from a specific video is collected from an external server site (for example, a social network service (SNS)), a blog, a portal site, or the like, and is compared with a plurality of frames extracted from a video, thereby judging to what frame of video the collected image corresponds.

Therefore, in the case in which a frame coinciding with the collected specific image is searched, related information (for example, connected web contents information) of the collected image is mapped to the corresponding frame and is stored, such that various analyses may be performed on video contents. Here, the related information may be a source (that is, a posted website) of the contents, the number of posted corresponding images, or the like. The video or a ranking of a specific image in the video, the number of citations for each source, or the like, may be calculated as an analysis result through the related information.

An 'external server' in the following description indicates a server providing various web services separately from the video capture image analyzing apparatus performing a video analysis according to the present invention. The external server is physically and logically separated from the video capture image analyzing apparatus, and may be connected to the video capture image analyzing apparatus through a predetermined wired/wireless communication network.

Hereinafter, exemplary embodiments of the present invention will be described in detail with reference to the accompanying drawings so that those skilled in the art may easily implement the spirit of the present invention.

Concept of Analyzing Video Using Captured Image

FIG. 1 is a diagram showing a concept of analyzing a video using a captured image according to an exemplary embodiment of the present invention. Referring to FIG. 1, a plurality of frames are first extracted from at least one video. Then, feature values of the respective extracted frames are stored in a database. In this case, it is preferable that representative frames among the plurality of frames are extracted and only the extracted representative frames are digitized and stored according to the exemplary embodiment of the present invention.

Meanwhile, a crawler collects a posting to which images captured from an external server (for example, a web server providing news, a blog, Twitter, Facebook, or the like) are attached and stores the collected posting as a search candidate in the database. Then, representative frames coinciding with the respective collected images among the representative frames extracted from the video are searched through a search engine.

An issue scene database for each video and a post database for each scene mentioning a corresponding issue scene are built according to the search result. In addition, various analyses such as calculation of a ranking of the video, selection of an issue scene in the video, or the like, based on the search result may be performed.

More specifically, in the case in which a representative frame coinciding with the collected specific image is searched, various information (for example, a source in which the corresponding collected image is posted, the number of references of the corresponding representative frame, a degree of diffusion or preference of the corresponding image (for example, the number of retweets (RT), the number of replies, the number of recommendations, or the like) collected together in connection with the collected image is mapped in the corresponding representative frame and is stored in the database.

Figure 10:
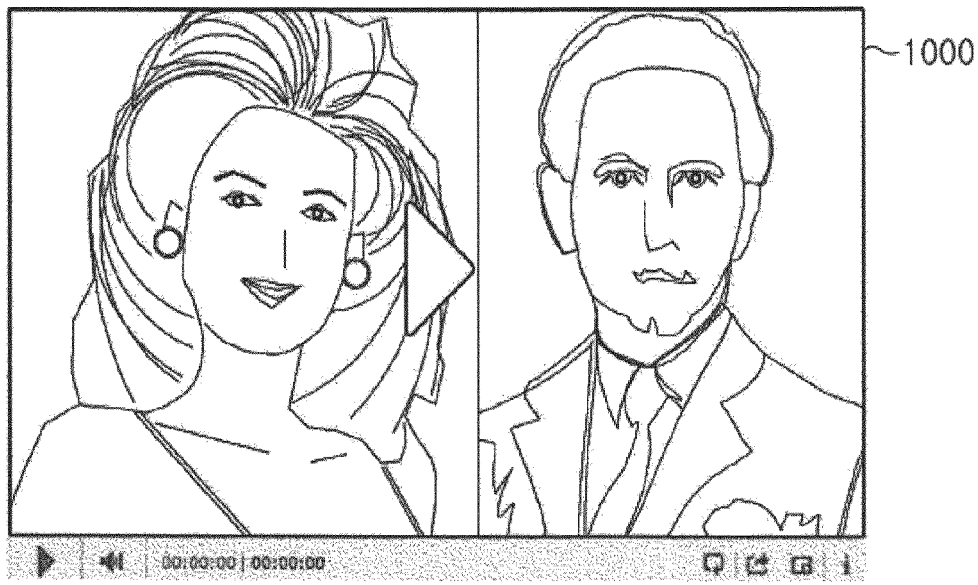

Therefore, as shown in FIGS. 8 to 10, an issue scene (that is, an issue frame) among representative frames extracted from a specific video, a list of posts mentioning the corresponding issue scene, rankings of videos, and the like, may be provided.

Hereinafter, an apparatus and a method for analyzing a video using a captured image according to an exemplary embodiment of the present invention will be described with reference to FIGS. 2 through 7.

Apparatus for Analyzing Video Using Captured Image

Figure 2:
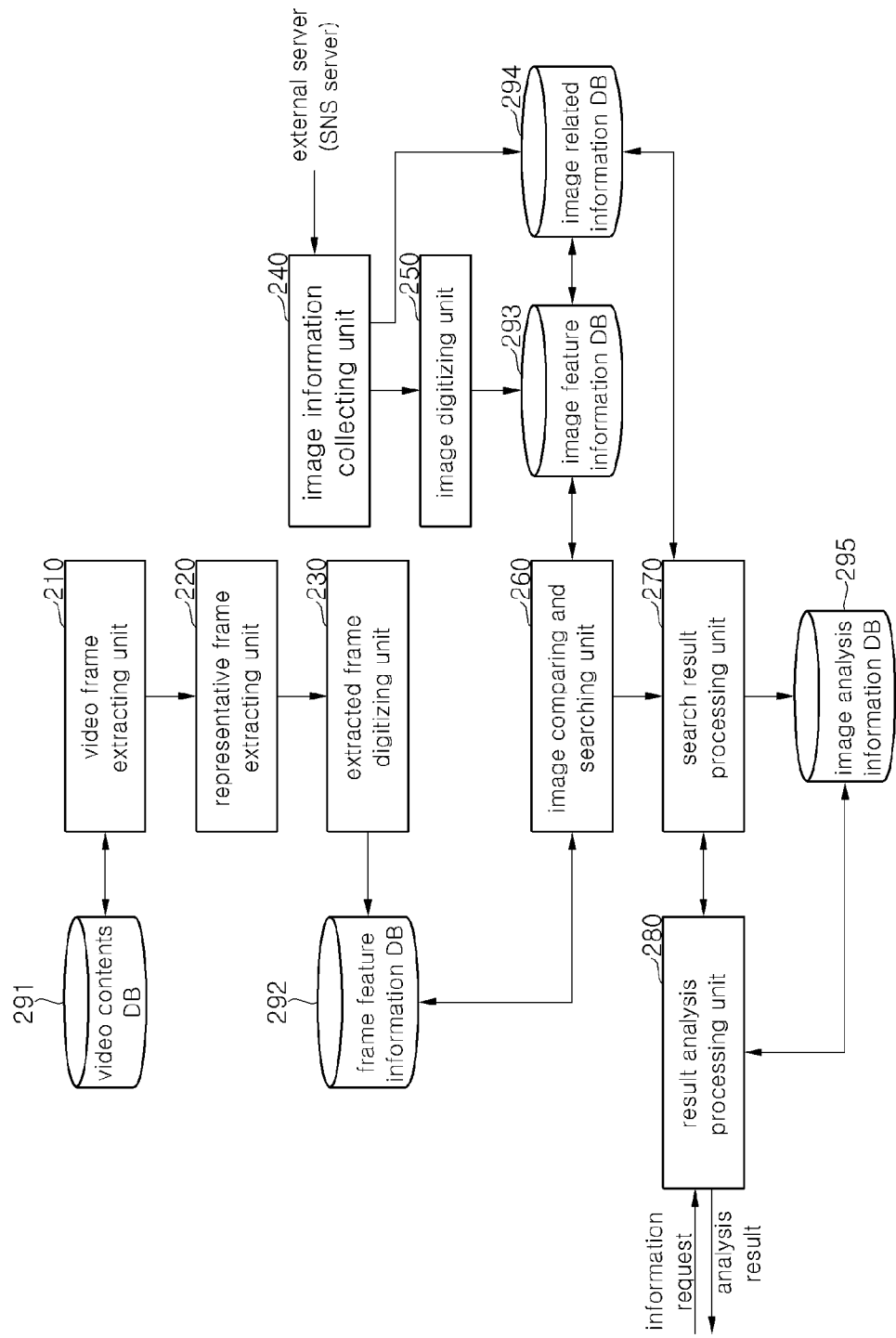
FIG. 2 is a block diagram showing a detailed configuration of an apparatus for analyzing a video using a captured image according to the exemplary embodiment of the present invention.

FIG. 2 is a block diagram showing a detailed configuration of an apparatus for analyzing a video using a captured image according to the exemplary embodiment of the present invention. Referring to FIG. 2, the apparatus for analyzing a video using a captured image according to the exemplary embodiment of the present invention may be configured to include a video frame extracting unit 210, a representative frame extracting unit 220, an extracted frame digitizing unit 230, an image information collecting unit 240, an image digitizing unit 250, an image comparing and searching unit 260, a search result processing unit 270, a result analysis processing unit 280. In addition, the apparatus for analyzing a video may include at least one database such as a video contents database 291, a frame feature information database 292, an image feature information database 293, an image related information database 294, an image analysis information database 295.

At least one video may be stored, for example, in a file form in the video contents database 291. Here, the video may be configured to include a plurality of frames (for example, thirty frames in one second, or the like). Any kind and any format of video may be applied to the present invention. For example, any kind of video such as a broadcasting video, a user created contents (UCC) video, a movie video, or the like, may be applied to the present invention. In addition, various related information (for example, meta information) on the stored video may be mapped to the stored image and be stored together in the video contents database 291. For example, information such as the source, the reproduction time, the broadcasting time, the broadcasting channel, the file format, and the like, of the video may be stored together.

The video frame extracting unit 210 selects a specific video stored in the video contents database 291 and extracts a plurality of frames included in the selected video.

The representative frame extracting unit 220 selects representative frames to be used as main frames among the plurality of frames extracted by the video frame extracting unit 210 according to the exemplary embodiment of the present invention. That is, in the case of the frames extracted by the vide frame extracting unit 210, since duplication (or similarity) between adjacent frames is strong, it is preferable to select and process representative frames according to the exemplary embodiment of the present invention in order to increase efficiency of a database configuration and search. Therefore, the present invention is not limited thereto, but may also be implemented so as to perform subsequent procedures on all frames in the extracted video or a frame suitable for a specific condition in the video.

In this case, a method of extracting the representative frames may be variously implemented. For example, as in the exemplary embodiments to be described below, in the case in which a difference value in a gray histogram between frames is a predetermined value or less, since images of the frames are images having strong duplication, the corresponding frames may be implemented to be excluded. Exceptively, in the case in which a difference in a gray histogram between frames is small but the images of the frames are different, the representative frames may be implemented to be forcibly selected per a predetermined time interval. A detailed description thereof will be provided below with reference to FIGS. 3 to 5.

As described above, when the representative frames are determined by the representative frame extracting unit 220, the extracted frame digitizing unit 230 digitizes features of the respective frames and stores the digitized features in the frame feature information database 292. A method of digitizing the features of the respective representative frames may be variously implemented. For example, a well-known image analyzing method, or the like, may be used. Although a visual word method is described as the method of digitizing the features of the representative frames by way of example in the present invention, the present invention is not limited thereto. A detailed description of the visual word method will be provided below with reference to FIG. 6.

The image information collecting unit 240 collects posts to which images (for example, images captured from a specific video) are attached from various external servers (for example, a portal site server, a social network service (SNS), a blog server, and the like). Here, the image information collecting unit 240 may be implemented using a crawler, or the like. However, the present invention is not limited thereto. The crawler, which is a kind of software used in a site opening a search engine in order to automatically search and index various information on a web, is also called a spider, a bot, or an intelligent agent.

The image information collecting unit 240 may additionally collect information such as a source in which the corresponding collected image is posted, a degree of diffusion or preference of the corresponding image (for example, the number of retweets (RT), the number of replies, various evaluation information (for example, the number of recommendations, the number of positives/negatives (or the number of agreements/disagreements or the like) when it collects the posts to which the images are attached. Image related information additionally collected by the image information collecting unit 240 may be linked to the corresponding image and be stored in the image related information database 294.

The image digitizing unit 250 digitizes the features of the respective images collected by the image information collecting unit 240 and stores the digitized features in the image feature information database 293. Here, it is preferable that the same method as the method in the extracted frame digitizing unit 230 is used as a digitizing method in the image digitizing unit 250. However, the present invention is not limited thereto. That is, a method of digitizing the features of the respective collected images may be variously implemented. For example, a well-known image analyzing method, or the like, may be used. Although a visual word method is described as the method of digitizing the features of the collected images by way of example in the present invention, the present invention is not limited thereto.

As described above, when a procedure of digitizing the features of the representative frames and the features of the collected images is completed, the image comparing and searching unit 260 compares the digitized value of the specific collected image with the digitized value of the representative frame stored in the frame feature information database 292. As the comparison result, a representative frame having a value coinciding with the specific image or a representative frame having the most similar value to that of the specific image is searched. In the case in which a visual word method to be described below is used as the method of digitizing the features, a representative frame having the most visual words that are the same as the specific image may be searched, or a frame in which a distance in image is in a predetermined distance when the number of appearances of the same words is defined as the distance between images may be searched.

When the representative frame coinciding with the collected specific image is searched by the image comparing and searching unit 260, the search result processing unit 270 reads out information in connection with the image coinciding with the searched corresponding frame from the image related information database 294 and stores the read out information in the image analysis information database 295.

In addition, when a request for information on the video is received according to the exemplary embodiment of the present invention, the result analysis processing unit 280 automatically calculates statistical values for the respective main frames for the specific video from the search result stored in the image analysis information database 295 to generate an analysis result and provides the generated analysis result to a user requesting the information. For example, as shown in FIGS. 8 to 10, as a search result for the video, various related information (for example, the numbers of news, blogs, SNS sites, or the like, referencing a corresponding image in the video, corresponding link information, and the like) on main images (or frames) of a specific video may be generated and provided to the user, according to the exemplary embodiment of the present invention.

Method for Extracting Representative Frame

Figure 3:
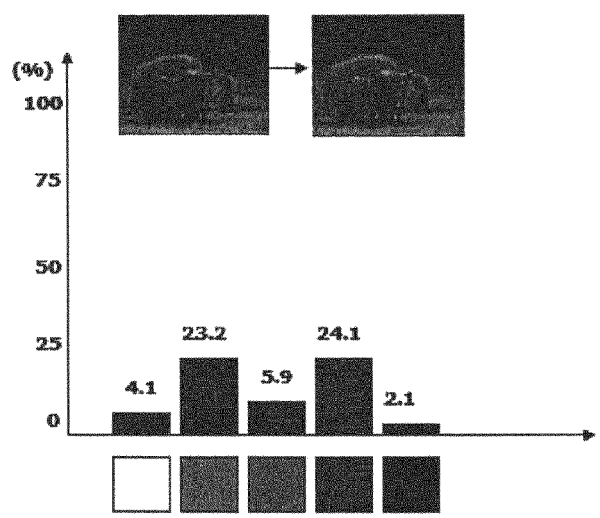
FIG. 3 is a graph showing a gray histogram of a specific frame for extracting a representative frame according to the exemplary embodiment of the present invention.

FIG. 3 is a graph showing gray histograms of video frames for extracting a representative frame according to the exemplary embodiment of the present invention. Referring to FIG. 3, the representative frame is extracted through a difference value in a gray histogram between frames according to the exemplary embodiment of the present invention.

That is, as shown in FIG. 3, the gray histogram for each frame is calculated, and it is judged that continuous frames are images having strong duplication (or similarity) in the case in which a difference value in a gray histogram between the continuous frames is a preset value or less. Therefore, only one frame is left as the representative frame, and remaining one or more duplicated frame is deleted. Therefore, only a specific frame satisfying a condition among a number of frames included in one video is extracted and processed as the representative frame, thereby making it possible to make a database configuration and search efficient.

The gray histogram may be calculated, for example, as shown in FIG. 3. More specifically, gray values of the respective pixels configuring the frame are calculated and whether or not they belong to a pre-divided section is calculated to calculate a ratio. Therefore, a distribution map of the gray values of the entire frame image may be calculated as shown in FIG. 3.

Figure 4:
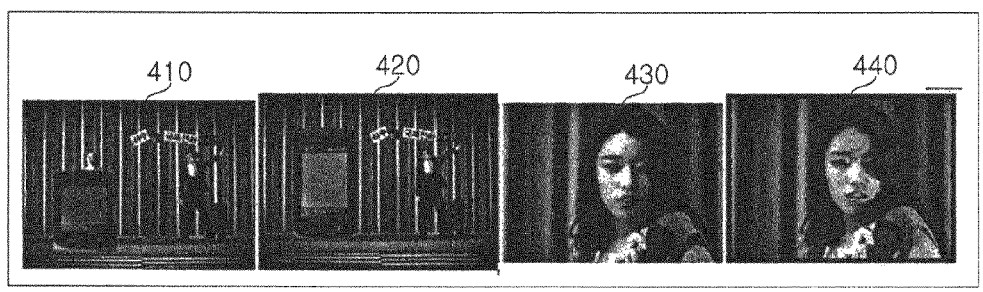
FIG. 4 is a diagram showing a frame comparison for selecting a representative frame according to the exemplary embodiment of the present invention.

FIGS. 4 and 5 show a method for selecting a representative frame using the gray histogram, or the like. That is, referring to FIG. 4, it may be appreciated that a frame 410 and a frame 420, which are continuous frames, are images having strong duplication since a difference in a gray histogram therebetween is a preset value or less. Therefore, the frame 410 is excluded, and the frame 420 is selected as the representative frame. Likewise, it may be appreciated that a frame 430 and a frame 440, which are continuous frames, are images having strong duplication since a difference in a gray histogram therebetween is a preset value or less. Therefore, the frame 430 is excluded, and the frame 440 is selected as the representative frame. Likewise, in the case in which a difference in a gray histogram among three or more continuous frames is a preset value or less, only one frame may be left as the representative frame, and remaining two frames may be excluded.

In a special case, there is a possibility that the difference in a gray histogram as described above will be the preset value or less, but the frames may be different images. Therefore, according to the exemplary embodiment of the present invention, even though the difference in a gray histogram is the preset value or less, the representative frame may be implemented to be forcibly selected once per a preset time (for example, one second). That is, referring to FIG. 5, although all of the frames 510 to 550 have a gray histogram of a preset value or less, images of the frames 520 and 530 may be different images. Therefore, according to the exemplary embodiment of the present invention, the representative may be implemented to be necessarily selected per a predetermined period.

Method for Digitizing Representative Frame

When the representative frames are selected by the method as shown in FIGS. 4 and 5, features of the respective selected frames are digitized and stored in the database. FIG. 6 is a diagram showing a concept of a method for digitizing a representative frame according to the exemplary embodiment of the present invention.

That is, in order to compare the representative frames with the collected images according to the exemplary embodiment of the present invention, the respective representative frames and the respective collected images are digitized as the feature values thereof, are stored, and are compared with each other. As an example of a method of digitizing the image as the feature value, a visual word method may be used.

The visual word method is a method of searching invariant points of the images or the frames, digitizing and representing the invariant points, and converting and using the digitized invariant points into predefined cluster values in order to be easily searched.

More specifically, as shown in FIG. 6, the respective clusters are divided into the predetermined numbers in advance using a plurality of training images. Here, the respective unit clusters are called visual words. Next, an invariant point is obtained with respect to one image, and a descriptor is obtained as a statistical value capable of representing a feature of the invariant point. Since the descriptor is a kind of vector, the closest cluster belonging to the vector is obtained and used as a feature value of this point. Through the above-mentioned process, as shown in FIG. 6, one image may be represented by one feature value histogram capable of being represented by frequencies of the visual words.

The respective representative frames included in the video may be digitized and stored using the above-mentioned method. The above-mentioned method is only an example for assisting in the understanding of the present invention. Therefore, the present invention is not limited thereto.

Meanwhile, in FIG. 6, each of the clusters of the histogram representing the feature values may be considered as a visual word representative of the image (or the frame). Finally, one image may be represented by at least one (preferably, a plurality of) visual word(s) and frequencies of the respective visual words.

Therefore, the images are collected by the image information collecting unit 240, such that when a query image is entered, the visual words representative of the collected image are obtained by, for example, the above-mentioned method, and are compared with the visual words of the respective representative frames stored in the database. In this case, a frame having the most same visual words may be considered as the same frame as the query image in a scheme used in an information search. That is, when a database having the video stored therein is stored in an inverted file form in a scheme similar to a general information search method, the image that is the most similar to the query image may be rapidly searched. In addition, the number of appearances of the same visual words may be defined as a distance between images, and only images between which the distance is a predetermined distance or less may be considered as the same frames.

As described above, when the same frames as the respective collected images among the representative frames extracted from the video are searched, various related information (for example, a source in which the corresponding collected images are posted, a degree of diffusion or preference of the corresponding images (for example, the number of retweets (RT), the number of replies, various evaluation information (for example, the number of recommendations, the number of positives/negatives (or the number of agreements/disagreements, or the like) on the images collected together with the images is matched to the searched frames and is stored.

Method for Analyzing Video Using Captured Image

Figure 7:
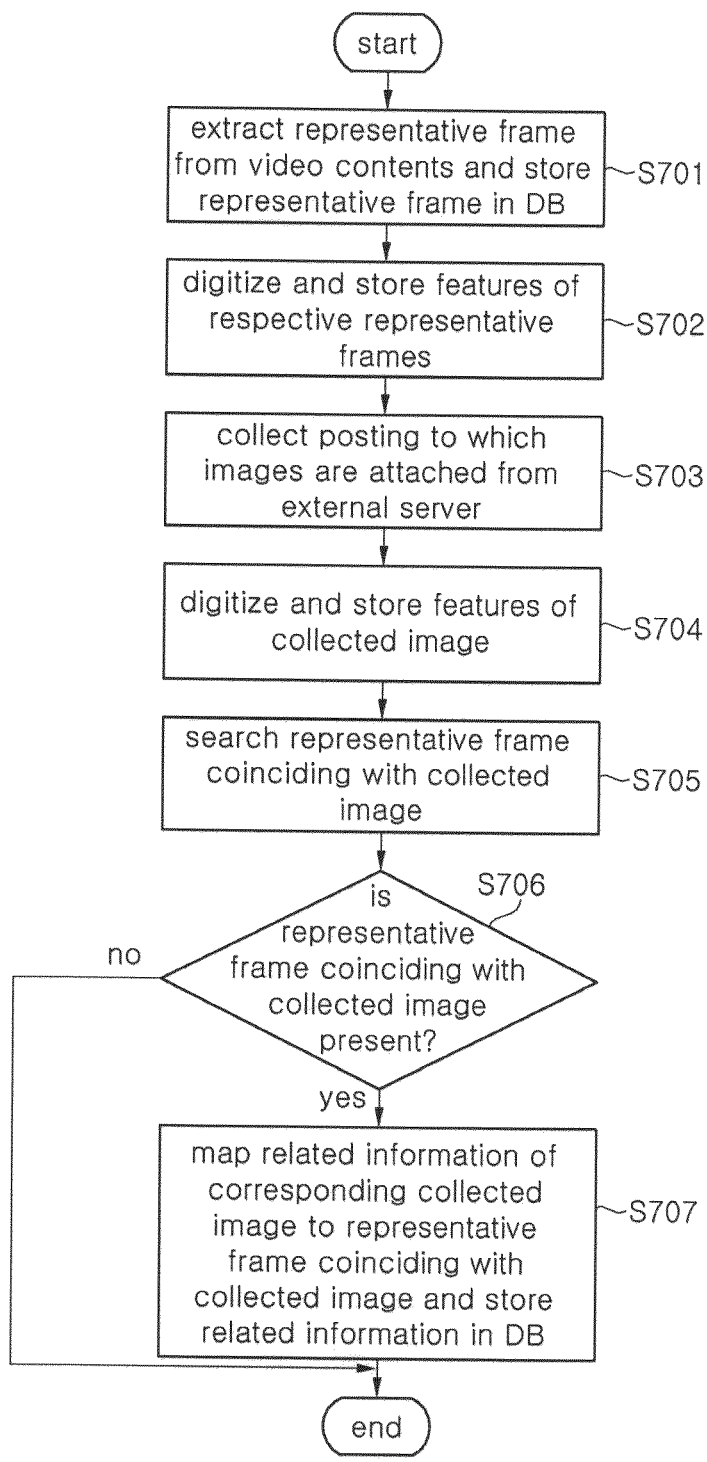
FIG. 7 is a flow chart showing a procedure for analyzing a video using a captured image according to the exemplary embodiment of the present invention.

FIG. 7 is a flow chart showing a procedure for analyzing a video using a captured image according to the exemplary embodiment of the present invention. Referring to FIG. 7, as described above, first, the representative frames are extracted from the video contents and are stored in the database (S701). Then, the features of the respective extracted representative frames are digitized and stored in the database (S702).

In addition, the postings to which images are attached are collected from the external servers (S703), and the features of the collected images are digitized and stored in the database (S704).

Then, according to the exemplary embodiment of the present invention, the representative frames coinciding with the collected images are searched from the respective representative frames stored in the database (S705).

If the representative frames coinciding with the collected images are present (S706), the related information of the corresponding collected images is mapped to the searched representative frames and stored in the database (S707).

Examples of Result of Analyzing Video

FIGS. 8 to 10 are diagrams showing examples of a result of analyzing a video using a captured image according to the exemplary embodiment of the present invention.

Referring to FIG. 8, in a web, news, an SNS, or the like, a video capture screen is attached and posted or referenced, or a ranking of a corresponding video or a corresponding capture screen of the video may be provided according to the number of mentions.

For example, when a television broadcasting title such as a 'program A' is input as a search word in a search portal site as shown (800), statistical information and ranking information mentioned relating to the captured specific scenes in broadcasting images in each date are provided according to the exemplary embodiment of the present invention, thereby making it possible to recognize what scene of what broadcasting date was the largest issue. That is, a capture image 810 and related information 820 of a specific scene may be sequentially provided according to the number of captures, postings, references, or mentions of the specific scene among the corresponding broadcasting videos. For example, since an image captured in 14 seconds in a broadcasting on May 23, 2012 among the broadcastings of the searched corresponding programs is a scene posted or referenced most, it is displayed on the top portion of the search result. Here, the number of mentions 821 to 824 of the corresponding scene may be displayed together with the corresponding capture image 810 for each source (for example, news, a blog, Twitter, Facebook, and the like). Likewise, a capture image of the corresponding broadcasting posted and referenced second most may be displayed under the image captured in 14 seconds in the broadcasting on May 23, 2012.

A method of determining rankings of the respective scenes may be variously implemented. For example, the rankings may be determined by summing up the number of postings or references for each source or be determined by allocating weights to each source and summing up the weights.

Meanwhile, when a 'mention of scene in video' displayed as related information on a specific capture image on the search result screen is selected, information on a source in which a corresponding scene is mentioned may be provided as shown in FIG. 9.

That is, referring to FIG. 9, a list 900 for a mention of a corresponding scene in a corresponding video may be provided for each source. For example, the respective sources 910 in which the corresponding scene is mentioned in the news, the respective sources 920 in which the corresponding scene is mentioned in Twitter, the respective sources in which the corresponding scene is mentioned in a blog, the respective sources in which the corresponding scene is mentioned in Facebook, and the like, may be provided. In this case, when information on the respective sources is selected, direct connection to a corresponding posting such as the news, the blog, Twitter, Facebook, and the like, in which the corresponding scene is mentioned may also be implemented.

As described above, according to the exemplary embodiment of the present invention, selected scenes may be classified for each specific source (news, a blog, a cafe, an SNS, and the like) and a degree of diffusion or preference (RT, reply, good, and the like) may be socially analyzed to provide rankings of popular scenes for each source or be utilized as meta information for rankings of the search results as shown in FIG. 8.

As another implementation of the present invention, as shown in FIG. 10, an issue scene for a specific video may be listed and provided. That is, corresponding issue information may be tagged on the video to be analyzed in advance based on an image in the video such as <popular scene> or <issue scene> in a video replay service, or the like, thereby providing a service.

For example, referring to FIG. 10, when a replay service of a specific video is selected, a video reproducing player 1000 may be disposed on the top and an issue scene ranking 1010 may be provided on the bottom according to the exemplary embodiment of the present invention. That is, as described above, the rankings for the respective scenes in the video may be calculated by a preset method, and the respective scenes may be displayed according to a sequence of the rankings. In this case, statistics and posting lists of each source for the corresponding scene may be provided together with the information on the scenes according to each ranking. Therefore, when a video play mark 1020 is selected in the information on the corresponding scene, the video reproducing player 1000 of the top may be implemented to jump to the corresponding scene to reproduce the corresponding scene. In addition, when a specific source of a specific scene is selected in a scene link 1030, a list and a link of a post including a capture of the corresponding scene in the corresponding source may be provided as shown in FIG. 9. For example, when a Twitter 1040 of a screen is ranked third, the Twitter may provide a posting list and link of the corresponding scene.

In addition, as another implementation of the present invention, a video for a capture image captured and posted by an acquaintance may be provided, or other processed related information may be provided. For example, an acquaintance relationship or a contents subscription state of specific users are analyzed, thereby making it possible to provide a scene posted by the acquaintance in the SNS and a scene mentioned in a news service to which the user subscribes and a link of contents related to the corresponding scene. In addition, evaluation information such as positive evaluation, negative evaluation, or the like, of a contents link is collected and analyzed, thereby making it possible to analyze and provide a reaction of the corresponding scene.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. An apparatus for analyzing a video capture screen, the apparatus comprising:
   at least one storage device; and
   a processor configured to execute the functions of:
   a video frame extracting unit configured to extract at least one frame from a video having a plurality of frames;
   an extracted frame digitizing unit configured to digitize features of each of the at least one frame extracted by the video frame extracting unit;
   an image digitizing unit configured to digitize features of at least one collected search target image;
   an image comparing and searching unit configured to compare the collected search target image with the at least one frame extracted from the plurality of frames by digitized values of the collected search target image and the at least one frame; and
   a search result processing unit configured to map related information of the collected search target image to a frame coinciding with the collected search target image and storing the related information in a database, when the extracted at least one frame coinciding with the collected search target image is present in a comparison result.

2. The apparatus of claim 1, further comprising a representative frame extracting unit configured to determine one frame selected among the at least one frame from the video to be a representative frame in a case in which an image difference among a plurality of continuous frames extracted by the video frame extracting unit is in a preset range,
   wherein the extracted frame digitizing unit is configured to digitize the representative frame determined by the representative frame extracting unit and store the digitized representative frame in the database.

3. The apparatus of claim 2, wherein the representative frame extracting unit is configured to determine the one frame selected among the plurality of continuous frames to be the representative frame in a case in which a difference value in a gray histogram among the plurality of continuous frames is a predetermined value or less.

4. The apparatus of claim 2, wherein the representative frame extracting unit is configured to determine at least one frame to be the representative frame per a preset time.

5. The apparatus of claim 1, wherein the extracted frame digitizing unit is configured to digitize invariant points of the at least one extracted frame and then represent the invariant points by a frequency of visual words converted into predefined cluster values.

6. The apparatus of claim 5, wherein the image digitizing unit is configured to digitize invariant points of the at least one collected search target image and then represent the invariant points by a frequency of visual words converted into predefined cluster values.

7. The apparatus of claim 6, wherein the image comparing and searching unit is configured to compare the visual words of the at least one extracted frame with the visual words of the at least one collected search target image and determine that corresponding frames and images coincide with each other when a number of same visual words is a preset number or more.

8. The apparatus of claim 1, wherein the related information of the collected search target image is any one or more selected among a source in which the collected search target image is posted, a number of retweets of the collected search target image on a social network service (SNS), a number of replies, a number of recommendations, and evaluation information.

9. The apparatus of claim 1, further comprising: a result analysis processing unit configured to automatically calculate statistical values for the extracted at least one frame for a specific video from the comparison result stored by the search result processing unit to generate an analysis result.

10. The apparatus of claim 9, wherein the result analysis processing unit is configured to provide information selected from a number of citations in a news, a blog, an SNS site referencing a corresponding image in the video and corresponding link information with respect to the extracted at least one frame of the video according to a result analysis request.

11. The apparatus of claim 9, wherein the result analysis processing unit is configured to calculate and provide rankings of the extracted at least one frame from a number of citations in a news, a blog, an SNS site referencing a corresponding image in the video with respect to the respective frames of the specific video according to a result analysis request.

12. A method that uses a processor to analyze a video capture screen, the method comprising:
   extracting at least one frame from a video having a plurality of frames;
   digitizing features of the extracted at least one frame;
   digitizing features of at least one collected search target image;
   comparing, by the processor, the collected search target image with the at least one frame extracted from the plurality of frames by digitized values of the collected search target image and the at least one frame; and
   mapping related information of the collected search target image to a frame coinciding with the collected search target image and storing the related information in a database, when the extracted at least one frame coinciding with the collected search target image is present in a comparison result.

13. The method of claim 12, further comprising, after the at least one extracting of the frame, determining one frame selected among the plurality of frames to be a representative frame in a case in which an image difference among a plurality of extracted continuous frames is in a preset range,
   wherein in the digitizing of the features of the extracted frames, the determined representative frame is digitized.

14. The method of claim 13, wherein in the determining, one frame selected among the plurality of continuous frames is determined to be the representative frame in a case in which a difference value in a gray histogram among the plurality of frames is a predetermined value or less.

15. The method of claim 13, wherein in the determining, at least one frame is determined to be the representative frame per a preset time.

16. The method of claim 12, wherein in the digitizing of the features of the extracted frames, invariant points of the at least one extracted frame are digitized and are then represented by a frequency of visual words converted into predefined cluster values.

17. The method of claim 16, wherein in the digitizing of the feature of the at least one collected search target image, invariant points of the at least one collected search target image are digitized and are then represented by a frequency of visual words converted into predefined cluster values.

18. The method of claim 17, wherein in the comparing, the visual words of the at least one extracted frame are compared with the visual words of the at least one collected search target image and the corresponding frames and images are determined to coincide with each other when the number of same visual words is a preset number or more.

19. The method of claim 12, further comprising, after the storing, automatically calculating statistical values for the extracted at least one frame for a specific video from the stored comparison result to generate an analysis result.

20. A non-transitory computer readable medium comprising an executable program which, when executed in a computer, performs a method for analyzing a video using the image captured from the video, the method comprising:
  extracting at least one frame from a video having a plurality of frames;
  digitizing features of the extracted at least one frame;
  digitizing features of at least one collected search target image;
  comparing the collected search target image with the at least one frame extracted from the plurality of frames by digitized values of the collected search target image and the at least one frame; and
  mapping related information of the collected search target image to a frame coinciding with the collected search target image and storing the related information in a database, when the extracted at least one frame coinciding with the collected search target image is present in a comparison result.

* * * * *